United States Patent [19]
Loveless

[11] 3,930,634
[45] Jan. 6, 1976

[54] SAFETY CONTROL FOR VALVE
[75] Inventor: Stanley M. Loveless, Oshtemo Township, Kalamazoo County, Mich.
[73] Assignee: General Gas Light Company, Kalamazoo, Mich.
[22] Filed: June 20, 1974
[21] Appl. No.: 481,108

[52] U.S. Cl. .............................................. 251/96
[51] Int. Cl.² .................................... F16K 35/02
[58] Field of Search ........................ 251/96, 97, 100

[56] References Cited
UNITED STATES PATENTS
| | | | |
|---|---|---|---|
| 1,687,554 | 10/1928 | Gansfried | 251/97 |
| 1,716,277 | 6/1929 | Messmer | 251/96 |
| 1,920,511 | 8/1933 | Kulicke et al. | 251/97 |

Primary Examiner—Henry T. Klinksiek
Attorney, Agent, or Firm—Woodhams, Blanchard and Flynn

[57] ABSTRACT

Safety device for controlling a valve. For application to a valve for controlling fluid flow, there is provided a normally inoperative device which the operator must consciously and deliberately render operative before the valve can be changed from one setting to another. In the illustrated embodiment, a valve activating device is held in inoperative position by suitable resilient means. To render same operative, the operator pushes the operating device against such resilient means into engagement with a desired portion of the valve for effecting the desired operation. As shown, such operating means automatically disengages only in one selected position of the valve, such as the "off" position, but remains engaged while the valve is in the other position, such as the "on" position. It is, however, possible by a simple modification to render same automatically disengageable as the valve attains either position.

3 Claims, 5 Drawing Figures

SAFETY CONTROL FOR VALVE

FIELD OF THE INVENTION

The invention relates to a control means for a fluid controlling valve and particularly to such control means as are automatically inoperable in selected positions of the valve and must be deliberately rendered operable by an operator before same become effective to change the valve position.

BACKGROUND OF THE INVENTION

While the valve of the invention is applicable to a wide variety of uses, the particular problem out of which the invention arose is in the field of operating a gas valve supplying a gas light. Accordingly, the following discussion will be in terms of such environment and use with the understanding, however, that same is primarily for illustrative purposes and the valve in question and means for operating same will be equally applicable to other environments and other uses.

In the control of gas burning devices, such as gas lights, it is essential that same be safetied against improper turning on of the gas supply, including accidental turning on by inadvertent contact with the valve control means or by manipulation of the valve by a child. For this purpose, it is desirable that valve control means be provided which will be automatically inoperative in one or more selected positions of the valve, which can be rendered operative only by a deliberate movement thereof by an operator and which movement is a different movement from that by which the valve is moved from one setting to another.

In the long history of gas burning equipment, including gas lights, this problem has been long recognized and many valves and valve controls have been offered for this purpose. Some of these are reliable and effective but, insofar as I am aware, those which are of acceptable reliability and effectiveness are relatively expensive to make and those which are of attractively inexpensive nature are not acceptably reliable or effective. It is therefore desirable to provide a controlling device for an otherwise standard valve which will automatically render itself inoperative in at least one selected position of the valve and wherein same can be rendered operative by a simple and natural manipulation on the part of the operator and which controlling means can be manufactured and installed with a maximum of economy but without loss of reliability. Further, it is desirable to provide such a valve controller which by simple modification can be rendered capable of deactivating itself in any desired position of the valve including multiple positions thereof.

Accordingly, the purposes of the invention include:

1. To provide a control device for a valve which will normally inactivate itself in at least one operating position of the valve.

2. To provide a valve controlling device, as aforesaid, which can be activated by a simple and natural movement on the part of the operator but which requires a deliberate and intentional such movement in a predetermined single manner in order to accomplish such reactivation.

3. To provide such a valve, as aforesaid, which can be manufactured and installed for operation with an otherwise standard valve with a maximum degree of economy while maintaining a high level of reliability and effectiveness.

4. To provide a valve controller, as aforesaid, which can be caused to inactivate itself, as aforesaid, in any one selected position of the valve or by a simple modification in multiple selected positions.

5. To provide a valve controller, as aforesaid, which will be effective to operate with a wide variety of standard valves with no more than a simple modification thereof and, if desired under some circumstances, with no modification at all.

Other objects and purposes of the invention will be apparent to persons acquainted with devices of this general sort upon reading the following specification and inspecting the accompanying drawings.

SUMMARY OF THE INVENTION

The invention in the illustrated embodiment comprises a rod mounted for both rotation around and reciprocation along an axis fixed with respect to the valve stem and preferably coaxially therewith. One or more radial projections is or are applied to the end of said rod adjacent said valve stem and arranged to be received in a slot therein. A guard plate is provided adjacent the end of said valve stem having an opening therein through which said rod extends and having recesses adjacent said opening for reception of said projections whereby when said projections are within the plane of said guard plate said rod cannot rotate and when said projections move out of the plane of said guard plate they enter into the slot of the valve stem and can rotate for rotating the valve stem. Resilient means normally hold the rod in such position that the projections are within the plane of said guard plate but the urging of said resilient means can be overcome by an operator pushing said rod thereagainst and thereby urging said projections into said slot for engagement with said valve stem. The recesses in said guard plate may be positioned and provided, as desired, to enable said projections to move into the plane of said guard plate when the valve stem corresponds to any one position, or multiple positions, of the valve.

DETAILED DESCRIPTION

Figure 1:
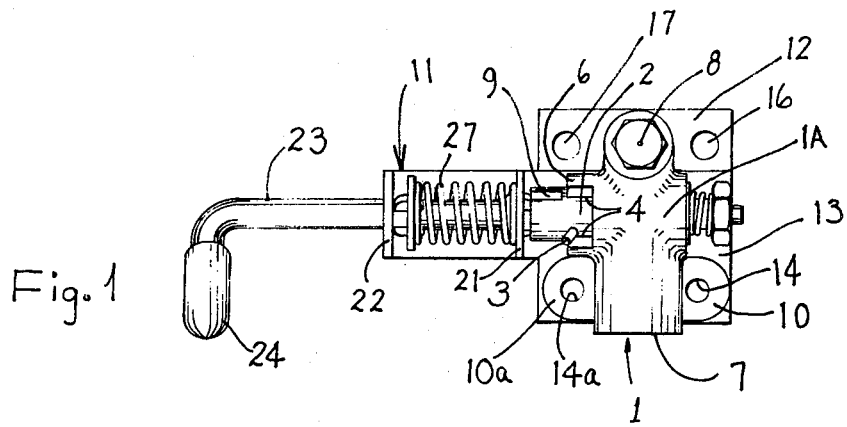
FIG. 1 is a top plan view of a valve embodying the invention.

Referring now to the drawings, there is shown a valve 1 of any conventional type having a valve housing 1A containing therein a movable valve member (not shown) which in this case is operated by a rotatable stem 2 between open and closed positions. A pin 3 is provided on said stem for limiting the rotation of the stem 2 by appropriate contact with the edges 4 of the valve housing flanges 6. In this case gas enters at the end 7 and exits through the small opening 8 into the burning means, as the mantle of a conventional gas light (not shown). A diametric slot 9 is provided in the stem 2 of the valve for purposes appearing hereinafter. Sideward extending feet 10 and 10a are provided with openings 14 and 14a for mounting purposes.

The operating means 11 for the valve comprises a pair of angle members 12 and 13 of which the bottom member 12 has at one end lateral projections including on one side openings in register with openings 14 and 14a and on the other side the openings 16 and 17. The top member 13 has only a single lateral projection in register with the openings 14 and 14a. Thus, the screws 15 and 20, being tapped into the openings 14 and 14a of the valve base, hold the members 12 and 13 tightly together and in a fixed relationship with the valve while the openings 16 and 17 are available to fasten the unit to mounting means as desired.

The flanges 21 and 22 of said angle members are spaced as shown and provided with coaxial openings therethrough as further detailed below, which openings are also coaxial in this embodiment with the valve stem 2. An operating rod 23, preferably provided with a manually engageable handle 24, extends through said openings and is arranged as further described below for engagement at the choice of the operator with the slot 9.

Figure 2:
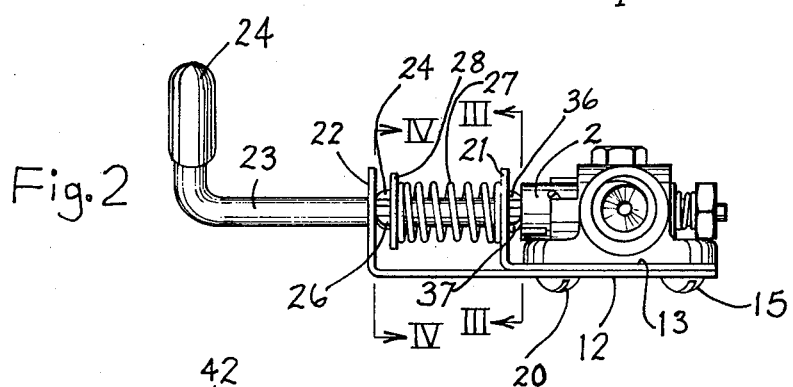
FIG. 2 is a side elevational view of the valve of FIG. 1.

The rod 23 is provided with at least two radially extending projections or lugs 24 and 26 (FIG. 4) which may be provided in any convenient manner such as by striking same from the periphery of the rod 23. Since the opening through the flange 22 is circular, the lugs 24 and 26 effectively prevent the rod 23 from moving leftwardly from the position shown in FIGS. 1 and 2. A spring 27 encircles the rod 23 and bears at its one end against the flange 21 and at its other end against a washer 28 interposed between said spring and the lugs 24 and 26. Said washer 28 has a pair of depressions 31 and 32 provided therein for the reception of the lugs 24 and 26, respectively, same being held therein by the pressure of the spring urging the washer 28 against said lugs. Said washer further, however, has openings 33 and 34 therethrough which renders possible the easy assembly of the parts by passing said washer 28 by means of the openings 33 and 34 over the hereinafter mentioned lugs at the end of the rod 23 adjacent the valve.

Figures 3, 4:
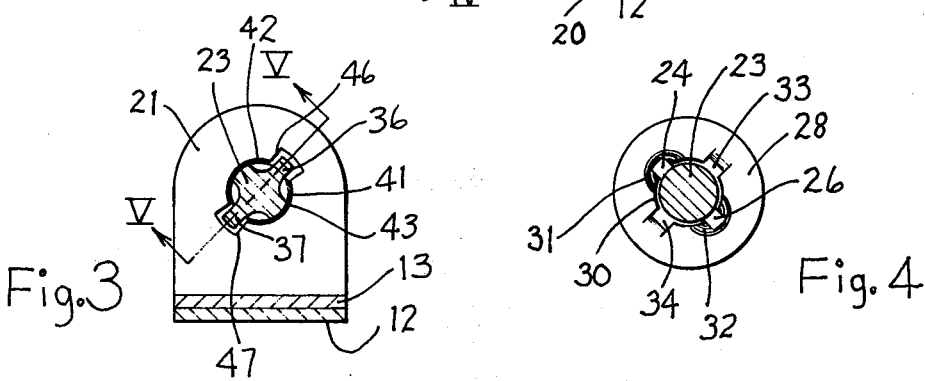
FIG. 3 is a section taken on the line III—III of FIG. 2.
FIG. 4 is a sectional view taken on the line IV—IV of FIG. 2.
Figure 5:
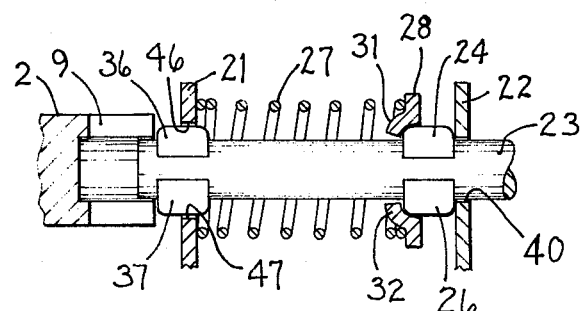
FIG. 5 is a fragmentary sectional view on an enlarged scale taken on the line V—V of FIG. 3.

Looking now at the last-named end of the rod 23, there are provided lugs 36 and 37, again in any convenient manner such as by striking same from the surface of the rod, as indicated by the scalloped portions in FIG. 3, of which one thereof is indicated at 41.

There is provided in the flange 21 an opening therethrough for the rod 23 comprising circular arcs 42 and 43 connected by substantially rectangular and radially projecting recesses 46 and 47. Said recesses are of such size as to permit passage therethrough of the lugs 36 and 37. Preferably also said openings 36 and 37 have a slightly trapezoidal shape to permit passage of the lugs 36 and 37 therethrough at somewhat more than a single rotative position.

Thus, when the parts are in the position shown in the drawings, the lugs 36 and 37 are in the plane of the flange 21 and are received into the recesses 46 and 47. Thus, in this position the lugs 36 and 37 are disengaged from the slot 9 and the rod 23 is incapable of rotating more than a very limited amount. Hence, an operator grasping the handle 24 is not only unable to rotate the valve stem 2 but by being unable to turn the operating rod 23 at all, he is reminded that the operating device is in an inoperative position. However, upon pushing the rod 23 against the resilience of the spring 27 toward said valve, rightwardly as appearing in FIGS. 1 and 2, the lugs 36 and 37 are moved out of the plane of the flange 21 and into the slot 9 of the valve stem. Said rod 23 is now free to rotate and with it to cause the valve stem to rotate. This will presumably place the valve into a second position, normally an open position although whether such rotation effects opening or closing of the valve in a given case is a matter of choice.

In such second position, the lugs 36 and 37 now bear against the unbroken surface of the flange 21 and the lugs 36 and 37 remain against the urging of the spring 27 in the slot 9. Thus, to move the valve out of such second position and back to the first position it is necessary only to rotate the rod 23 in the opposite direction, the lugs 36 and 37 already being free of any restriction of the nature of the recesses 46 and 47 and being within the slot 9 to effect rotative movement of said stem 2. The valve can thus be returned to its first position without other manipulation than reverse rotation of the rod 23.

It will be appreciated that all the parts above described can be readily made by extremely simple procedures and assembly thereof is equally simple. The rod 23 with the handle 24 removed is slipped through the opening 40 in the flange 22 and the washer 28 and spring 27 are then passed across the lugs 36 and 37 into the position shown against the lugs 24 and 26. The part 13 is then placed in position with the flange 21 passed partially across the lugs 36 and 37 and the parts then fixed with respect to each other by placement of the screws 15 and 20 through the flanges 12 and 13 and into the valve body openings 14 and 14a as shown.

It will be recognized that further recesses corresponding to the recesses 46 and 47 can be provided in the flange 21 to render the valve operator inoperative in additional positions of the valve if desired. For example, if desired, such recesses may be provided in appropriate alignment with the slot 9 when same is in both its first and second positions, namely positions corresponding to both the open and closed positions of the valve, and the operating device will thereupon without further modification thereof be capable of rendering itself inoperative in each of such positions.

It will also be recognized that if desired, instead of slotting the valve stem 2, it will be possible to place a collar thereon and slot the collar in a manner similar to that above described for slotting of the valve stem. In such case, no modification at all will be required of the valve unit itself.

While particular embodiments of the invention have been set forth herein to illustrate the invention, it will be apparent that other modifications may be made herein without departing from the basic concept of the invention and that such modifications will be covered by the hereinafter appended claims excepting as said claims by their express terms limit otherwise.

The embodiments of the invention in which an exclusive property or privilege is claimed are defined as follows:

1. In combination, a valve assembly including a valve housing having a projecting valve stem rotatably supported thereon, the valve housing also having a mounting surface thereon, and a manually-actuated operator coacting with said valve stem for controlling the rotational movement of said valve stem between first and second positions, comprising the improvement wherein said operator includes:

an elongated rod positioned coaxially with said valve stem and having noncircular means at its inner end adjacent said stem effective upon axial movement of said rod for interengaging with said stem for effecting rotational movement of said stem upon rotational movement of said rod;

first and second L-shaped support members fixedly mounted on said valve housing and slidably supporting said rod thereon, said first and second support members respectively including first and second support plates disposed directly adjacent one another and overlying said mounting surface;

said first and second support members respectively including first and second flanges extending substantially transverse to the respective support plates, said first flange being disposed adjacent said stem, said second flange being substantially parallel to but spaced outwardly from said first flange, and said elongated rod being slidably supported on and extending through said first and second flanges;

handle means disposed outwardly from said second flange and fixedly connected to the outer end of said rod;

resilient means disposed between said first and second flanges and encircling said rod for constantly urging said rod outwardly away from said valve stem into a retracted position wherein the inner end of said rod is disengaged from said valve stem; and locking means coacting between said rod and said first flange for preventing rotation of said rod when said valve stem is in said first position and said rod is in its retracted position, said locking means including an opening in said first flange and a projection fixed to said rod and positionable within said opening for preventing rotation of said rod when it is in said retracted position, said projection being removed from said opening and engaged with said valve stem when said rod is moved inwardly toward said valve stem whereby said rod can be rotatably displaced for moving said valve stem from said first position to said second position, said first flange preventing said rod from being returned outwardly into its retracted position when said rod is being rotatably moved between said first and second positions;

whereby said rod may be pushed inwardly against the resilient means by an operator into engagement with said valve stem for rotation thereof but will, in response to said resilient means when said valve stem is in said first position, disengage itself from said valve stem so that said projection enters into said opening for holding said rod nonrotatable with respect to said first flange.

2. A combination according to claim 1, wherein said projection comprises a lug which projects radially outwardly of the rod, said opening in said first flange including a circular center portion for rotatably receiving therein said rod and an outwardly projecting radial portion for receiving therein said lug when said rod is in said retracted position, said rod having a second lug formed thereon and projecting radially therefrom, said second lug being disposed between said first and second flanges, and said resilient means comprising a coil spring disposed in encircling relationship to said rod and having one end thereof bearing against said first flange and the other end thereof bearing against said second lug whereby said rod is resiliently urged outwardly toward said retracted position, said first support plate being sandwiched between said mounting surface and said second support plate, and threaded fastener means coacting between said first and second support plates and said housing for fixedly but releasably attaching said first and second support members to said housing.

3. In a valve controller for a gas valve having a valve stem rotatably supported on a valve housing, the combination comprising:

bracket means adapted to be fixedly but releasably attached to said valve housing, said bracket means including first and second substantially parallel flanges having substantially aligned openings therethrough, said openings being substantially aligned with said valve stem and said first flange being closely adjacent said valve stem;

an elongated rod extending between and projecting outwardly beyond the opposite sides of said first and second flanges, said rod being rotatably supported relative to said first and second flanges and having noncircular means at its inner end adjacent said stem and effective upon axial movement thereof for engaging said stem to effect rotation thereof toward or away from a preselected rotational position upon rotation of said rod;

said rod being axially slidably supported on said first and second flanges when said valve stem is in said preselected position, said valve stem being axially movable inwardly into an engaged position wherein said inner end is engaged with said valve stem to permit rotation thereof;

spring means disposed between said first and second flanges and encircling said rod for urging said rod outwardly into a retracted position wherein the inner end of said rod is disengaged from said valve stem;

a noncircular opening within said first flange for receiving said noncircular means upon retraction of said rod into its retracted position, said noncircular means being received within said noncircular opening when said valve stem and said rod is in said preselected rotational position for permitting retraction of said rod to disengage same from said valve stem, said rod when in said retracted position being held against rotation by said noncircular means being engaged within the noncircular opening in said first flange; and handle means fixedly connected to the outer end of said rod and spaced outwardly from said second flange.

* * * * *